T. C. CRAVEN.
Saw for Cotton Gins.

No. 56,684.

Patented July 24, 1866.

Witnesses
E. R. Lawin
Chas H Smith

Inventor
Thomas Cowell Craven

UNITED STATES PATENT OFFICE.

THOMAS C. CRAVEN, OF ALBANY, NEW YORK.

IMPROVED SAWS FOR COTTON-GINS.

Specification forming part of Letters Patent No. 56,684, dated July 24, 1866.

*To all whom it may concern:*

Be it known that I, THOMAS COWELL CRAVEN, of the city and county of Albany and State of New York, have invented, made, and applied to use a certain new and useful Improvement in Saws for Cotton-Gins; and I do hereby declare the following to be a full, clear, and exact description of the same, reference being had to the annexed drawings, making part of this specification.

Similar letters of reference denote the same parts.

In cotton-gins heretofore constructed the cotton is drawn away from the seeds by the teeth of a series of saws forming a cylinder, the seeds themselves being kept back by guards or strippers. The teeth of these saws are very liable to cut and injure the cotton, and reduce its market value; besides which the teeth are of such a shape that the cotton-seeds are often broken and pieces of the seeds pass away with the cotton.

The nature of my said invention consists in an improved saw for the cylinder of cotton-gins, said saw being formed with hook-shaped teeth that are rounded upon their edges, so as not to cut or injure the cotton and not to break the seeds.

In order to form each saw I take a circular plate of steel with a polygonal hole in the center, and place the same on an arbor that is moved around progressively by a ratchet the amount necessary between each stroke of a punch that is provided to cut out one or more teeth each blow.

Each tooth is to be formed of a hooked shape, the exterior or back of the tooth being convex and the under side concave, the tooth itself forming a point. I then subject the saw to the action of dies that are shaped to correspond with the teeth and round the angles or edges of the teeth, so that a section through one of the teeth would be a flattened ellipse. The dies also bring the teeth to a sharp or needle-shaped point.

A ginning-cylinder formed of a series of these saws upon an axis or polygonal shaft with packing-disks intervening presents a large number of smooth teeth, that draw the cotton away from the seeds without injury to the cotton and without breaking the seeds.

Figure 1:
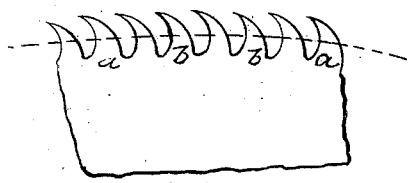
Figure 2:
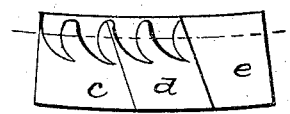
Figure 2:
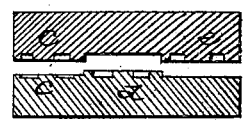
Figure 2:
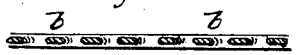

In the drawings, Figure 1 represents, in about twice the usual dimensions, several of the teeth upon a portion of the edge of a saw, the teeth at *a a* being in the form in which they are first cut out, and at *b* with the edges rounded and smoothed by the action of the dies. Fig. 2 is a section of the finished teeth at the line *x x*. Fig. 3 is a plan, and Fig. 4 a sectional elevation of the dies that I employ for rounding the teeth.

These dies are fitted in any desired press, so as to be opened and closed with the required power, and the saw is fed around, tooth by tooth, to the action of these dies by suitable mechanism. The dies themselves are formed in three steps or gradations, each of which contains one or more recesses for the teeth.

The step *c* of the dies is formed with a cavity in each face corresponding exactly when the dies are closed to the finished tooth, so that the teeth of the saw as they come (as at *a*) from the first or cutting operation are compressed, rounded, pointed, and smoothed, so that there are no sharp angles to injure the staple of the cotton.

At *d* the step is formed with a cavity entirely on one side and a plain surface on the opposite die, and at *e* the reverse step is made, the cavity being entirely on the other die. The object of this is to clean out between the teeth first in one direction and then the other, as they are successively presented, and remove any burrs, fins, or roughnesses that may result from the action of the part *c* of the dies, or from cutting out the teeth, and thereby make the teeth entirely smooth and adapted to the cotton-gin as aforesaid.

What I claim, and desire to secure by Letters Patent, is—

A saw for cotton-gins formed with rounded teeth of the character specified, as and for the purposes set forth.

In witness whereof I have hereunto set my signature this 19th day of June, A. D. 1866.

THOMAS COWELL CRAVEN.

Witnesses:
E. R. LAWIN,
GEO. D. WALKER.